US012154736B2

(12) United States Patent
Korves et al.

(10) Patent No.: US 12,154,736 B2
(45) Date of Patent: Nov. 26, 2024

(54) SEPARABLE ELECTRICAL CONNECTOR WITH A SWITCHING APPARATUS

(71) Applicant: Eaton Intelligent Power Limited, Dublin (IE)

(72) Inventors: Brian Korves, Greendale, WI (US); David C. Hughes, Rubicon, WI (US); Daniel P. Roth, Pewaukee, WI (US)

(73) Assignee: Eaton Intelligent Power Limited, Dublin (IE)

( * ) Notice: Subject to any disclaimer, the term of this patent is extended or adjusted under 35 U.S.C. 154(b) by 499 days.

(21) Appl. No.: 17/344,130

(22) Filed: Jun. 10, 2021

(65) Prior Publication Data

US 2021/0398760 A1 Dec. 23, 2021

Related U.S. Application Data

(60) Provisional application No. 63/042,629, filed on Jun. 23, 2020.

(51) Int. Cl.

| | |
|---|---|
| ***H01H 33/60*** | (2006.01) |
| ***H01H 1/24*** | (2006.01) |
| ***H01H 1/38*** | (2006.01) |
| ***H01H 33/662*** | (2006.01) |
| *H01H 33/666* | (2006.01) |
| *H01R 13/713* | (2006.01) |

(52) U.S. Cl.

CPC ........ *H01H 33/66207* (2013.01); *H01H 1/24* (2013.01); *H01H 1/38* (2013.01); *H01H 33/6661* (2013.01); *H01R 13/7135* (2013.01)

(58) Field of Classification Search

None

See application file for complete search history.

(56) References Cited

U.S. PATENT DOCUMENTS

| | | | | |
|---|---|---|---|---|
| 3,471,669 A | 10/1969 | Curtis | | |
| 4,618,749 A * | 10/1986 | Bohme | ............ H01H 33/66207 | 218/134 |
| 5,808,258 A | 9/1998 | Luzzi | | |

(Continued)

FOREIGN PATENT DOCUMENTS

| | | |
|---|---|---|
| EP | 0782162 A2 | 7/1997 |
| GB | 2160710 A | 12/1985 |

(Continued)

OTHER PUBLICATIONS

Elastimold® Cable Accessories: Underground Distribution Switchgear, Thomas & Betts Corp., pp. A58-A69 (obtained Jan. 15, 2020).

(Continued)

*Primary Examiner* — Courtney L Smith

(74) *Attorney, Agent, or Firm* — DiBerardino McGovern IP Group LLC

(57) ABSTRACT

An electrically insulating housing including a mechanical interface, the mechanical interface configured to mechanically connect the electrical connector to or disconnect the electrical connector from a bushing of an external device; an electrical system including: an electrical conductor; and a switching apparatus in an interior of the insulating housing; and a control system configured to control current flow in the electrical conductor by controlling a state of the switching apparatus.

22 Claims, 5 Drawing Sheets

(56) References Cited

U.S. PATENT DOCUMENTS

| | | | | | |
|---|---|---|---|---|---|
| 5,864,942 | A | 2/1999 | Luzzi | | |
| 5,963,021 | A * | 10/1999 | Rostron | H02J 3/1821 | 323/210 |
| 6,744,255 | B1 * | 6/2004 | Steinbrecher | H01R 4/66 | 361/107 |
| 7,901,228 | B2 * | 3/2011 | Hughes | G01R 31/74 | 439/88 |
| 10,601,170 | B2 | 3/2020 | Gieger et al. | | |
| 2005/0082260 | A1 * | 4/2005 | Martin | H01H 33/027 | 218/118 |
| 2010/0136824 | A1 * | 6/2010 | Hughes | G01R 31/74 | 439/502 |
| 2011/0081793 | A1 * | 4/2011 | Hughes | H01H 33/666 | 29/874 |
| 2015/0262768 | A1 * | 9/2015 | Siebens | H01H 9/16 | 200/50.32 |

FOREIGN PATENT DOCUMENTS

| | | | |
|---|---|---|---|
| IN | 1587/DEL/2005 | | 12/2006 |
| WO | 2008100511 | A1 | 8/2008 |
| WO | 2008147369 | A1 | 12/2008 |

OTHER PUBLICATIONS

Elastimold® Product Guide, Protection and Control: Underground Distribution Switchgear, Catalog # PC-SWITCHGEAR-0903, Thomas & Betts Corp. (2003).

Trident® Solid Dielectric Switchgear, Catalog GW5-TS09, G&W Electric Co. (2009).

Cooper Power Series: Specifier's Guide, Publication No. BR100003EN, Eaton Corp. (2019).

Cooper Power Series: Loadbreak Connectors Catalog Data, Publication No. CA650062EN (2019).

8.7/15(17.5)kV European Separable Connectors, Shenzhen HiFuture Electric Co., Ltd, available at http://www.hifutureca.com/Products/8715175kve.html (2016).

Insulated Adapter Termination System (RICS) Brochure, TE Connectivity (2019).

Hongshang Termination Kit Website, Innovative Technologie, available at http://www.innovativetechnologie.com/hongshang-termination-kit.html (2018).

RICS Insulated T-adapter, TE Connectivity, available at https://www.te.com/usa-en/product-CAT-RICS.html (obtained Jun. 1, 2021).

Unscreened Separable Tee Connector with Mechanical Lug Single Core Copper Tape Unarmored Website, United Electric Co., Ltd, available at https://szhuaxia.en.made-in-china.com/product/nBvJglXDnwUS/China-CJ20-630DC-EN50181-11kV-12kV-15kV-24kV-25kV-630A-Unscreened-Separable-Tee-Connector-with-Mechanical-Lug-Single-Core-Copper-Tape-Unarmored-Front-Tee-.html (obtained Jun. 1, 2021).

Jan Fribert, European International Searching Authority, International Search Report and Written Opinion, counterpart PCT Application No. PCT/EP2021/025213, mailed Oct. 5, 2021, 14 pages total.

* cited by examiner 100
103
118
116b
114
180
110
116
130
116a
113
1B
1B'

116a
113

121
112
1C
1C'
155
156
150
151
152
153
130
102
157

SEPARABLE ELECTRICAL CONNECTOR WITH A SWITCHING APPARATUS

CROSS-REFERENCE TO RELATED APPLICATION

This application claims the benefit of U.S. Provisional Application No. 63/042,629, filed on Jun. 23, 2020 and titled SEPARABLE ELECTRICAL CONNECTOR WITH A SWITCHING APPARATUS, which is incorporated herein by reference in its entirety.

TECHNICAL FIELD

This disclosure relates to a separable electrical connector with a switching apparatus.

BACKGROUND

An electrical connector is used to connect electrical transmission and distribution equipment and electrical sources within a high-voltage electrical system.

SUMMARY

In one aspect, an electrical connector includes: an electrically insulating housing including a mechanical interface, the mechanical interface configured to mechanically connect the electrical connector to or disconnect the electrical connector from a bushing of an external device; an electrical system including: an electrical conductor; and a switching apparatus in an interior of the insulating housing; and a control system configured to control current flow in the electrical conductor by controlling a state of the switching apparatus.

Implementations may include one or more of the following features.

The electrical connector also may include an electrically conductive shell at an outer surface of the electrically insulating housing.

The electrical system also may include a cable, and the switching apparatus may be electrically connected to the electrical conductor and the cable.

In some implementations, when connected to the bushing of the external device, the mechanical interface surrounds the bushing of the external device.

The electrically insulating housing also may include a pulling structure, and the mechanical interface may be configured to disconnect from the bushing of the external device in response to a force applied to the pulling structure. The pulling structure may be configured to receive a hotstick, and the electrical connector is configured to be disconnected from the bushing of the external device with the hotstick.

The switching apparatus may be a vacuum interrupter.

In some implementations, the electrical connector also includes an actuator coupled to the switching apparatus, and the control system may be configured to control the actuator to cause the switching apparatus to open or close the electrical conductor.

The control system may be an electronic control system that is configured to communicate with the actuator to control the switching apparatus. The control system also may be configured to communicate with a remote station and is configured to control the actuator based on information from the remote station.

The external device may be a switchgear, a transformer, or a junction.

The mechanical interface may be a flexible material.

The electrically insulating housing and the mechanical interface may be a flexible material.

The electrically insulating housing may be a rigid material.

In another aspect, a system for an electrical power distribution network includes: a power device including a bushing, the power device being configured to receive electrical power from a source; and an electrical connector including a bushing interface configured to connect to or disconnect from the bushing, the electrical connector including: an insulating housing that defines the bushing interface; a switching apparatus inside the insulated housing; and a conductor including: a first end configured to electrically connect to the power device when the bushing interface is connected to the bushing; and a second end configured to electrically connect to a load. The the switching apparatus is configured to control current flow in the conductor.

Implementations may include one or more of the following features. The switching apparatus may be in series with the load.

The switching apparatus may be a vacuum interrupter.

The power device may be a transformer or a junction.

The electrical connector also may include a conductive shell at an outer surface of the electrically insulating housing.

The system also may include a controller configured to control a state of the switching apparatus.

Implementations of any of the techniques described herein may include a system, an assembly, an electrical connector, and/or a method. The details of one or more implementations are set forth in the accompanying drawings and the description below. Other features will be apparent from the description and drawings, and from the claims.

DRAWING DESCRIPTION

DETAILED DESCRIPTION

Figures 1A, 1B, 1C:
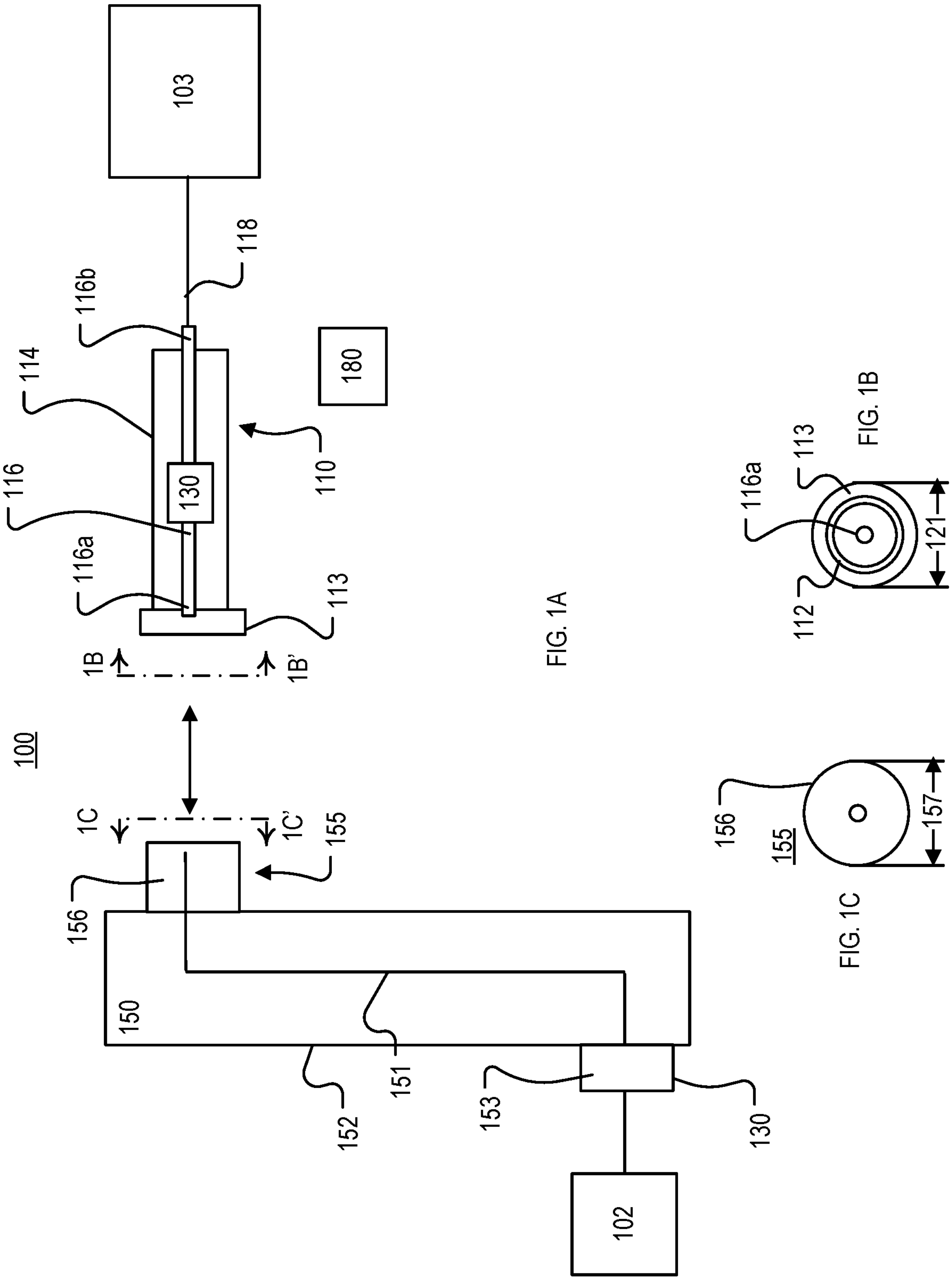
FIG. 1A is a block diagram of an alternating-current (AC) electrical power distribution network.
FIG. 1B is an end view of an electrical connector.
FIG. 1C is an end view of a bushing.

FIG. 1A is a block diagram of an alternating-current (AC) electrical power distribution network or electrical power system 100. The electrical power system 100 may be, part of, for example, an electrical grid, an electrical system, or a multi-phase electrical network that provides electricity to industrial, commercial and/or residential customers. The electrical grid may have an operating voltage of, for example, at least 1 kilovolt (kV), 12 kV, up to 34.5 kV, up to 38 kV, or 69 kV or higher, and may operate at a system frequency of, for example, 50 or 60 Hertz (Hz). All or part of the electrical power system 100 may be in an overhead power system configuration and/or in an underground power system configuration. Moreover, the electrical power system 100 may include additional components and systems that are not shown. For example, the electrical power system 100 may include cabinets, transformers, transmission lines and cables, substations, and support structures, just to name a few.

The electrical power system 100 includes a power device 150 and an electrical connector 110. The electrical connector 110 is a separable or movable electrical connector that may be connected to and disconnected from the power device 150. The electrical connector 110 may be, for example, a loadbreak elbow connector or a T-shaped connector. The power device 150 may be, for example, a transformer, a switching apparatus, a junction, or a sectionalizing cabinet. The power device 150 may be underground or overhead.

The electrical connector 110 functions as a switchgear that can be moved easily by an operator. For example, the electrical connector 110 may be moved with a hotstick. The electrical connector 110 includes a switching apparatus 130 that allows an electrical path between an AC electrical source 102 and a load 103 to be interrupted or opened. The switching apparatus 130 is controlled by a control system 180. For example, the control system 180 may be used to open the switching apparatus 130 such that the electrical path between the source 102 and the load 103 is interrupted or opened prior to physically separating the electrical connector 110 from the power device 150.

Figure 2:
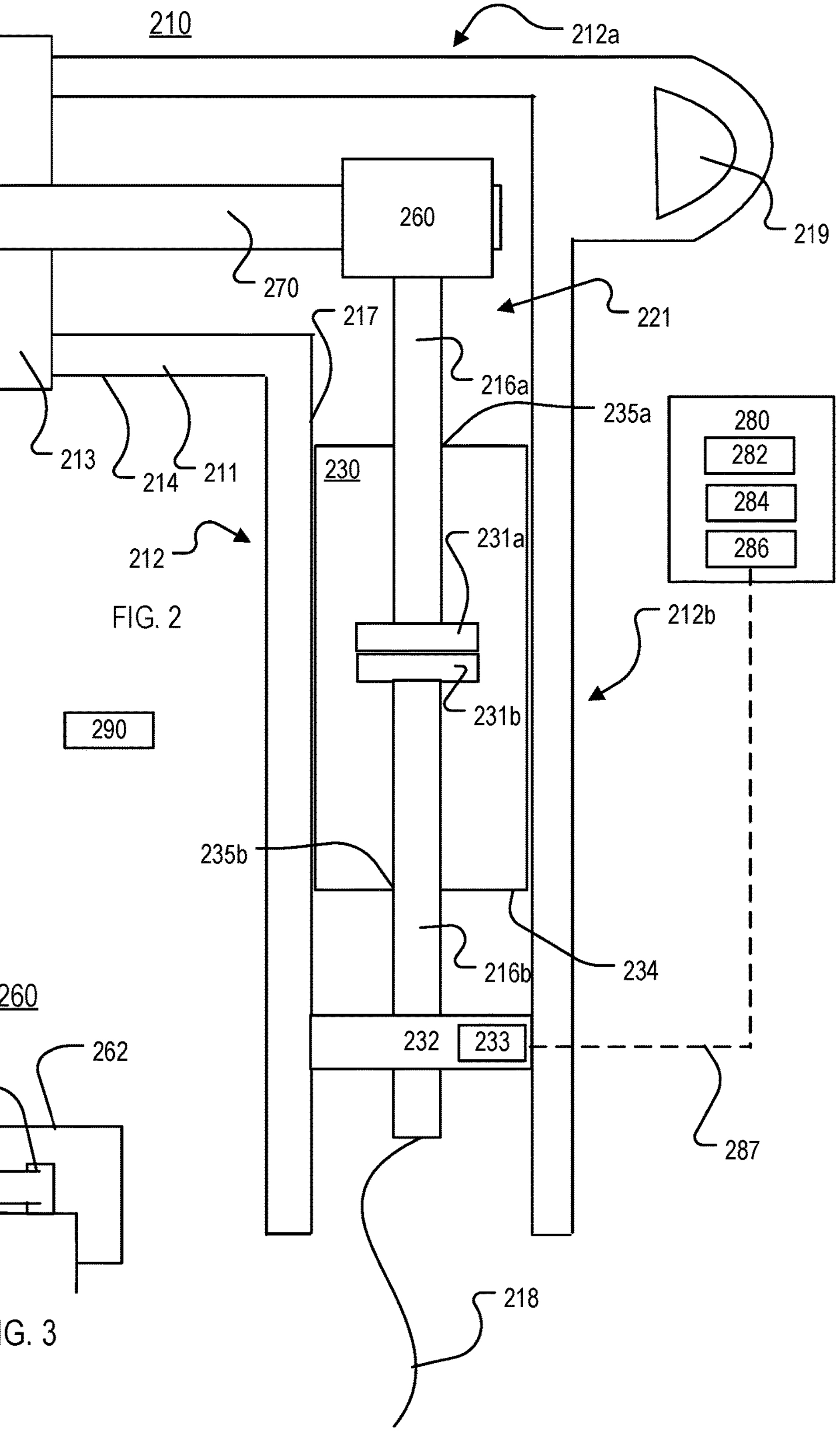
FIG. 2 is a side cross-sectional view of an electrical connector.

The switching apparatus 130 is any type of switching system that is controllable to be in one of at least two stable states: a first state that allows current to flow in a conductor 116 of the electrical connector 110, and a second state that prohibits current from flowing in the conductor 116. For example, the switching apparatus 130 may be a vacuum interrupter (such as shown in FIG. 2) or an automated switch.

The switching apparatus 130 may be capable of interrupting electrical current of, for example, 100 Amperes (A) or greater, 200 A or greater, 400 A or greater, 1 kA or greater, or 10 kA or greater. For example, in some implementations, the switching apparatus 130 is configured to interrupt electrical currents of up to 12.5 kA. In some implementations, the switching apparatus 130 is a fault interrupter, which is a device that is capable of interrupting currents that are much greater than the load current. For example, a fault interrupter may be configured to interrupt currents of 10 kA, 12.5 kA, or larger. In some implementations, the switching apparatus 130 is a switch that is capable of interrupting a typical load current (for example, a current between 200 and 600 A). Moreover, the switching apparatus 130 may be configured to interrupt a relatively wide range of currents. For example, the switching apparatus 130 may be configured to act as a fault interrupter and a switch that interrupts a typical load current. Regardless of the specific current rating, the switching apparatus 130 is controllable between at least the first state and the second state. After interrupting current, the switching apparatus 130 can be controlled or returned to the first state (that allows current flow). In other words, the switching apparatus 130 is reusable and resettable and is capable of repeatedly transitioning between the first state and the second state, and is also capable of interrupting relatively large amounts of current.

Legacy separable and/or movable electrical connectors can include over-voltage protection devices, such as metal-oxide-varistors (MOVs), that are not directly controllable by an operator or a control system. A MOV is a voltage-dependent resistor that provides over-voltage protection, but a MOV is not controllable to switch between an open state and a closed state and does not communicate with external devices. On the other hand, the switching apparatus 130 is a more sophisticated device compared to the protection mechanism in a legacy electrical connector. For example, the switching apparatus 130 is capable of repeatably interrupting current in an environment isolated from an operator, may be able to communicate with external devices, and/or may be configured to record the time and/or location of a fault or other related information.

The overall performance, usability, and safety of the electrical connector 110 is increased by including the switching apparatus 130. For example, the switching apparatus 130 may be implemented as a vacuum interrupter that reacts to faults automatically, and the vacuum interrupter may be implemented to communicate with external systems and devices. Moreover, the switching apparatus 130 may be controlled by the control system 180 to switch from the first state to the second state to interrupt the flow of current between the source 102 and the load prior to removing the electrical connector 110 from the power device 150. Because there is no current flowing in the electrical connector 110 at the time of separation, arcing that otherwise might occur at separation is avoided. After separation, the removed electrical connector 110 provides a visible break that informs an observer that current is not flowing between the source 102 and the load 103.

In greater detail, the power device 150 is electrically connected to the AC electrical source 102 through a source-side path 151. The source-side path 151 is any type of device capable of distributing electricity. For example, the source-side path 151 may be a transmission line, an electrical cable, or a combination of such devices. The source-side path 151 enters a housing 152 of the power device 150 at an input bushing 153, which is insulated and protects the source-side path 151. The power device 150 also includes a bushing 155. The bushing 155 is an insulated connector that passes through the housing 152. The source-side path 151 passes through and is protected by the bushing 155. External devices (such as the electrical connector 110) are physically connected to the power device 150 and are electrically connected to the source-side path 151 via the bushing 155.

The electrical connector 110 includes an insulating housing 112. Referring also to FIG. 1B, which is an end view of the electrical connector taken along line 1B-1B' of FIG. 1A, the insulating housing 112 has a circular shaped cross section in the plane shown in FIG. 1B. The cross-section of the insulating housing 112 may have other shapes.

Figure 6:
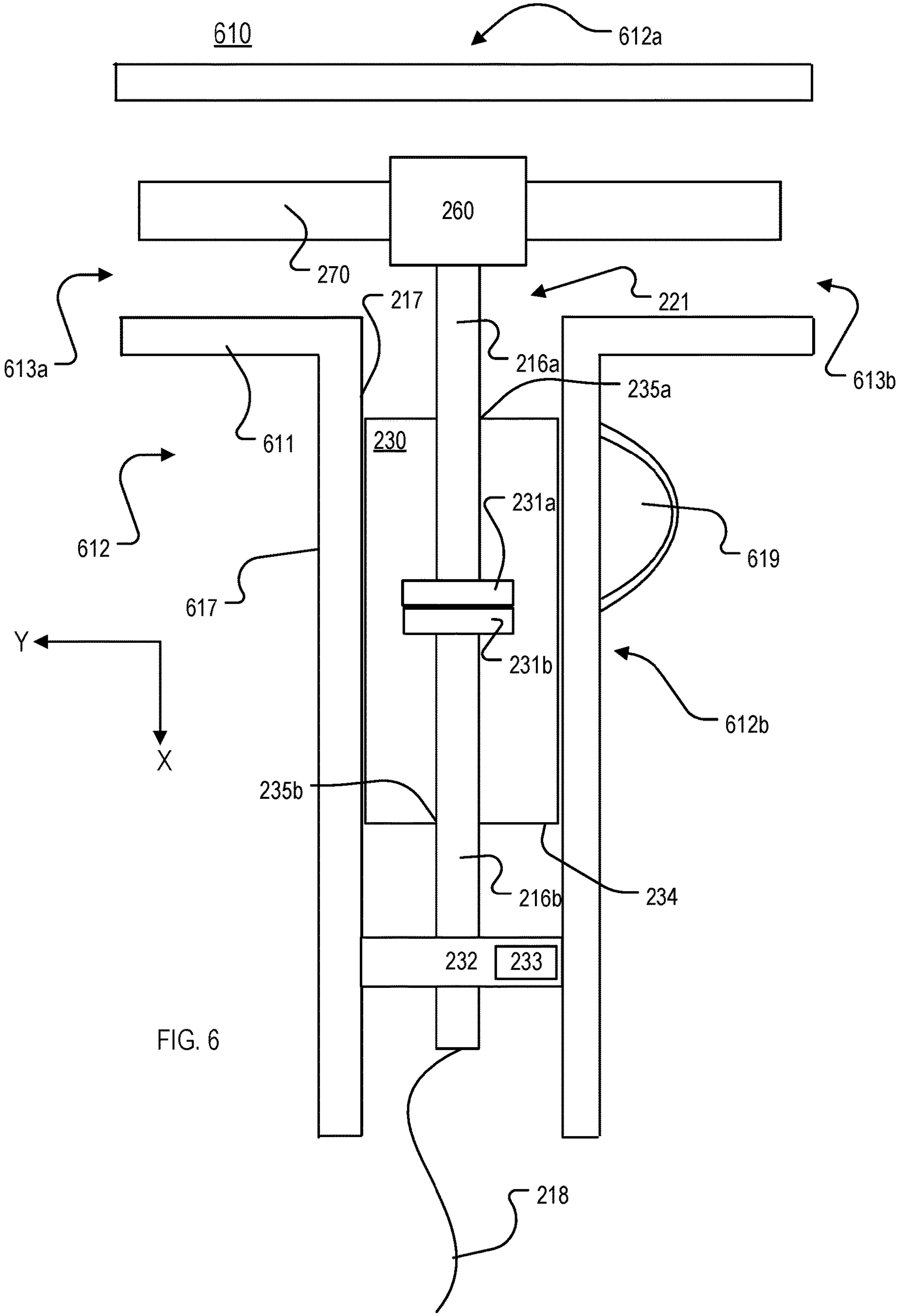
FIG. 6 is a side cross-sectional view of an electrical connector.

The insulating housing 112 is made of any electrically insulating material. For example, the insulating housing 112 may be made of, for example, ethylene propylene diene monomer (EPDM) rubber, any rubber material, silicone, a polymer, a hardened or solidified foam, and/or hardened epoxy. In the implementation shown in FIG. 1A, the electrical connector 110 includes a conductive shield 114 at an outer surface of the housing 112. The shield 114 is made of any electrically conductive or semiconductive material. For example, the conductive shield 114 may be made of cured EPDM doped with an electrically conductive material. The conductive shield 114 may be grounded. The electrical connector 110 may be implemented without the shield 114, such as shown in the example of FIG. 6. The electrical connector 110 has a mechanical interface 113 configured for connection to and disconnection from the bushing 155.

Referring also to FIG. 1C, which is a view of the bushing 155 taken along the line 1C-1C' of FIG. 1A, the bushing 155 includes an insulating housing 156. The insulating housing 156 has the same cross-sectional shape as the interface 113

(a circle in this example) and a diameter 157. The mechanical interface 113 has a diameter 121 that is slightly smaller than the diameter 157. The mechanical interface 113 is connected to the bushing 155 by fitting the interface 113 over the housing 156 and pressing the interface 113 toward the power device 150 until the interface 113 is held securely to the housing 156. The interface 113 may be held to the housing 156 by, for example, an interference or frictional fit between the interface 113 and the housing 156.

The electrical conductor 116 includes a first end 116*a* and a second end 116*b*. When the interface 113 is connected to the bushing 155, the first end 116*a* is electrically connected to the source-side path 151. The end 116*b* is electrically connected to a load-side path 118. The load-side path 118 may be, for example, an electrical cable or any other mechanism for conducting electricity. In the example shown in FIG. 1A, the load-side path 118 is electrically connected to the load 103. When the mechanical interface 113 is connected to the bushing 155 and the switching apparatus 130 is in the first state, the source 102 is electrically connected to the load 103 and current flows in the conductor 116. When the mechanical interface 113 is connected to the bushing 115 and the switching apparatus 130 is in the second state, the source 102 is not electrically connected to the load 103 and current does not flow between the end 116*a* and the end 116*b*. Regardless of the state of the switching apparatus 130, when the mechanical interface 113 is not connected to the bushing 155, the source 102 is not electrically connected to the load 103 and current does not flow between the end 116*a* and the end 116*b*.

Figure 4:
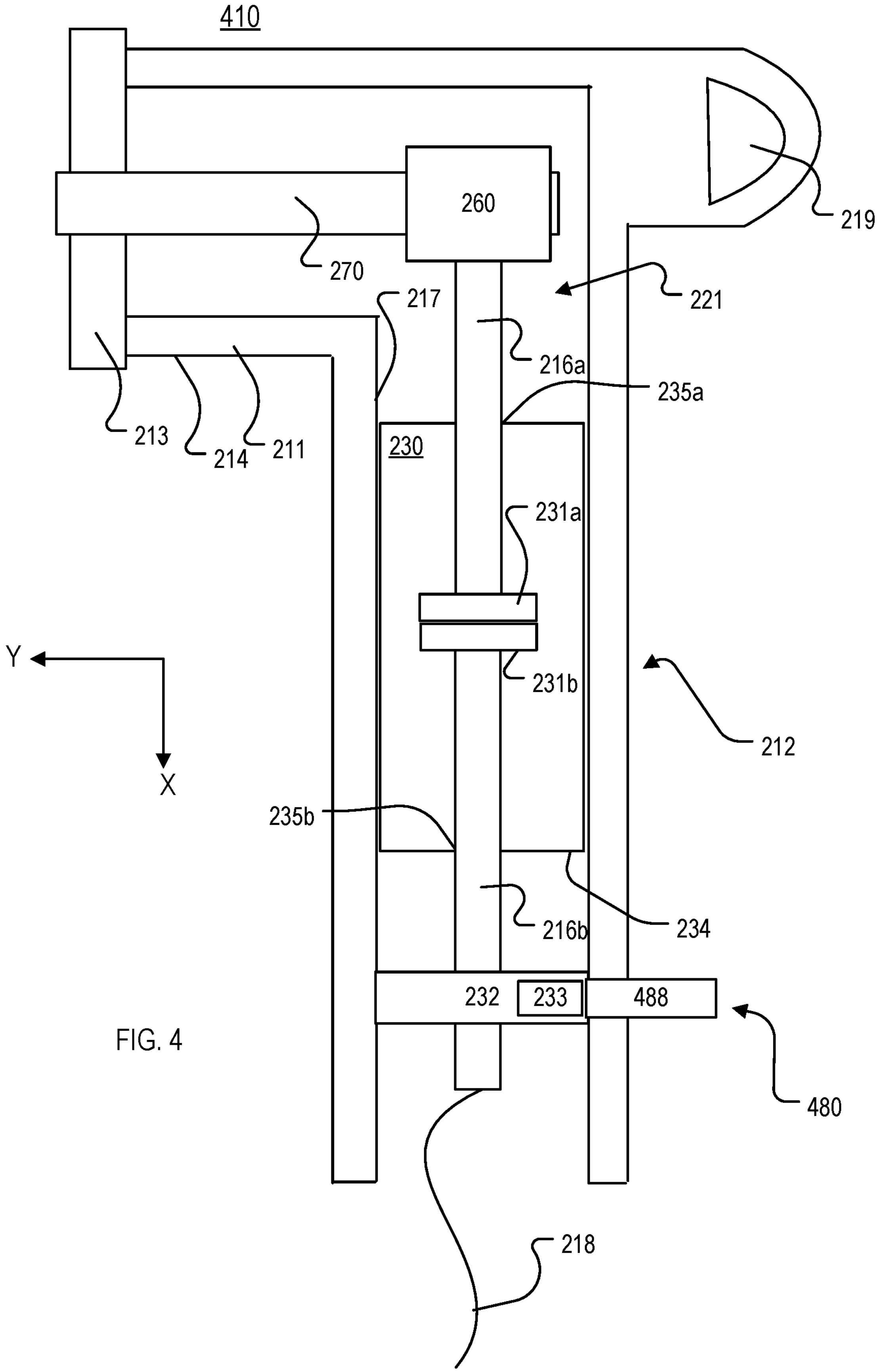
FIG. 4 is a side cross-sectional view of an electrical connector.

The control system 180 is any type of control system that is capable of causing the switching apparatus to open and close. For example, the control system 180 may be an electronic control system (such as shown in FIG. 2) that includes electronic elements such as one or more electronic processors and a machine-readable memory device, or a mechanical control system (such as shown in FIG. 4). In implementations in which the control system 180 is electronic, the control system 180 is capable of communicating with other electronic devices, a human operator (for example, through an interface), or with an autonomous process. Examples of a mechanical control system include a physical device, such as a knob or lever, that is actuated from outside the electrical connector 110 to open or close the switching apparatus 130.

FIG. 2 is a side cross-sectional view of an electrical connector 210. The electrical connector 210 is an example of an implementation of the electrical connector 110, and the electrical connector 210 may be used in the power system 100.

The electrical connector 210 is a three-dimensional structure. In the example shown, the electrical connector 210 is an elbow connector that extends in two orthogonal directions, X and Y. The electrical connector 210 includes a vacuum interrupter 230 within a housing 212. The housing 212 includes insulation 211. The insulation 211 is any material that provides electrical insulation. For example, the insulation 211 may be a polymer or a rubber, such as ethylene propylene diene monomer (EPDM). In the example shown in FIG. 2, the electrical connector 210 is an elbow connector. The housing 212 has a first portion 212*a* that extends generally along the Y axis and a second portion 212*b* that extends generally along the X axis. The insulation 211 has an interior wall or inner surface 217 that defines an interior space 221. The vacuum interrupter 230 is within the interior space 221 and is in the second portion 212*b*. An exterior surface of the insulation 211 is covered by a semiconductive shield 214. The housing 212 defines a pulling eye or opening 219. The opening 219 is sized to receive a hook or a hot stick. In the example of FIG. 2, the opening 219 extends away from the first portion 212*a*.

The vacuum interrupter 230 includes a housing 234 that encloses a stationary contact 231*a* and a movable contact 231*b* in an evacuated space. The housing 234 may be press fit or molded into the inner surface 217 of the insulation 211 such that the housing 234 remains in the interior 221 during use of the electrical connector 210. In some implementations, a sheet or mold of insulating rubber or polymer material is between the housing 234 and the inner surface 217.

The stationary contact 231*a* is connected to a stationary rod 216*a*. The movable contact 231*b* is connected to a movable rod 216*b*, which is coupled an actuator 232. The stationary rod 216*a*, the movable rod 216*b*, the stationary contact 231*a*, and the movable contact 231*b* are made of an electrically conductive material, such as, for example, a metal such as copper or a metal alloy. The stationary rod 216*a* passes through a first end 235*a* of the housing 234, and the movable rod 216*b* passes through a second end 235*b* of the housing 234. The first end 235*a* and the second end 235*b* are sealed around the respective rods 216*a* and 216*b* such that the evacuated space is maintained in the housing 234. The second end 235*b* may include additional components to allow the movable rod 216*b* to move. For example, the second end 235*b* may include bellows that are attached to the second end 235*b* and the movable rod 216*b*. The vacuum interrupter 230 also may include additional devices, such as current or voltage sensors that monitor electrical current in the contacts 232*a* and 232*b*. In some implementations, the vacuum interrupter 230 is associated with a current transformer (CT) and/or a voltage transformer (VT) that are used for harvesting energy.

The actuator 232 is any type of device or collection of devices 233 configured to cause the movable rod 231*b* to move along an axis of motion. In the example of FIG. 2, the actuator 232 causes the movable rod 216*b* to move in the X and −X directions. The devices 233 may include electrical devices, mechanical devices, and/or electromechanical devices. For example, the devices 233 may include motors, springs, gears, actuators, and/or other devices capable of causing the rod 216*b* to move. Moreover, the actuator 232 may include various components associated with the devices 233, such as electronics that are configured to power the devices 233.

The electrical connector 210 also includes a conductor 270 and a contact assembly 260. The conductor 270 is made of an electrically conductive material. The contact assembly 260 electrically connects the conductor 270 to the stationary rod 216*a*. When the vacuum interrupter 230 is closed, the conductor 270, the stationary rod 216*a*, the stationary contact 231*a*, the movable contact 231*b*, and the movable rod 216*b* are electrically connected. When the vacuum interrupter 230 is open, the stationary contact 231*a* and the movable contact 231*b* are separated from each other, and the conductor 270 is electrically disconnected from the movable contact 231*b* and the movable rod 216*b*.

Figure 3:
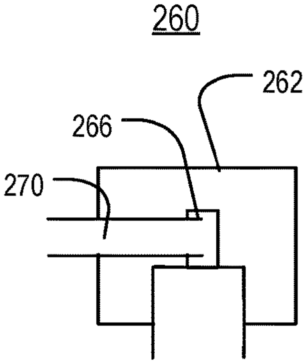
FIG. 3 is a block diagram of a contact assembly.

FIG. 3 shows a block diagram of an example implementation of the contact assembly 260. In the example shown in FIG. 3, the contact assembly 260 includes a semiconductive insert 262 that surrounds an electrically conductive connection junction 266. The conductor 270 and the stationary rod 216*a* are mounted in and are physically connected to each other at the connection junction 266. The connection junction 266 may be made of, for example, a metal such as brass or a metal alloy.

Returning to FIG. 2, the electrical connector 210 also includes a mechanical interface 213. The mechanical interface 213 is configured to attach to a bushing of a separate power device (such as the power device 150 of FIG. 1A). When the vacuum interrupter 230 is closed (as shown in FIG. 2), the stationary contact 231*a* and the movable contact 231*b* are physically connected. The movable rod 216*b* is electrically connected to a cable 218. When the vacuum interrupter 230 is closed, the conductor 270 is electrically connected to the cable 218. When the vacuum interrupter 230 is opened, the conductor 270 is electrically disconnected from the cable 218.

The actuator 232 is coupled to a control system 280 by a control path 287 (shown with a dashed line). The control system 280 is an electronic control system that communicates with the actuator 232 using electronic or optical signals that are sent through the control path 287. The control path 287 may be a physical connection, such as, for example, a cable, or the control path 287 may be a wireless communications channel. The control system 280 is shown as being separate from the actuator 232. However, the control system 280 may be part of the actuator 232. In the example shown in FIG. 2, the actuator 232 is inside the electrical connector 210, and in an implementation of the electrical connector 210 in which the control system 280 is part of the actuator 232, the control system 280 is inside the electrical connector 210.

The electronic processing module 282 includes one or more electronic processors. The electronic processors of the module 282 may be any type of electronic processor and may or may not include a general purpose central processing unit (CPU), a graphics processing unit (GPU), a microcontroller, a field-programmable gate array (FPGA), Complex Programmable Logic Device (CPLD), and/or an application-specific integrated circuit (ASIC). The electronic storage 284 may be any type of electronic memory that is capable of storing data, and the electronic storage 284 may include volatile and/or non-volatile components. The electronic storage 284 and the processing module 282 are coupled such that the processing module 282 may access or read data from the electronic storage 284 and may write data to the electronic storage 284. The electronic storage 284 also may store data received from the actuator 232 and/or the vacuum interrupter 230 or any included current or voltage transformers. For example, the electronic storage 284 may store data related to the number of times the vacuum interrupter 230 has been opened and closed or the current flow levels. The electronic storage 284 also may store instructions as, for example, a computer program or function, that when executed by the electronic processing module 282 cause the devices 233 of the actuator 232 to move the movable contact 216*b* in response to a command from the control system 280 and/or conditions in the vacuum interrupter 230.

The I/O interface 286 is any interface that allows a human operator and/or an autonomous process to interact with the control system 280. The I/O interface 286 may include, for example, a display, a keyboard, audio input and/or output (such as speakers and/or a microphone), a serial or parallel port, a Universal Serial Bus (USB) connection, and/or any type of network interface, such as, for example, Ethernet. The I/O interface 286 also may allow communication without physical contact through, for example, an IEEE 802.11, Bluetooth, or a near-field communication (NFC) connection.

The control system 280 may be, for example, operated, configured, modified, or updated through the I/O interface 286.

The I/O interface 286 is also connected to the control path 287 and allows the control system 280 to communicate with the actuator 232. For example, the control system 280 sends the actuator commands through the I/O interface 286 that cause the actuator 232 to move the movable rod 216*b* to thereby open or close the vacuum interrupter 230. The control system 280 also may receive data and information about the vacuum interrupter 230 from the actuator 232 via the I/O interface 286. For example, the control system 280 may receive status messages from the actuator 232 indicating whether or not the movable rod 216*b* moved in response to a command signal via the I/O interface 286.

The I/O interface 286 also may allow the control system 280 to communicate with systems external to and remote from the system 100. For example, the I/O interface 286 may include a communications interface that allows communication between the control system 280 and a remote station 290 using, for example, the Supervisory Control and Data Acquisition (SCADA) protocol or another services protocol. The remote station 290 may be any type of station through which an operator is able to communicate with the control system 280 without making physical contact with the control system 280. For example, the remote station 201 may be a computer-based work station, a smart phone, tablet, or a laptop computer that connects to the control system 280 via a services protocol, or a remote control that connects to the control system 280 via a radio-frequency signal.

The electrical connector 210 may be used in the power system 100 (FIG. 1A). When used in the power system 100, the cable 218 is electrically connected to the load 103, and the mechanical interface 213 is mounted to the bushing 155. Mounting the mechanical interface 213 to the bushing 155 mechanically connects the electrical connector 210 to the power device 150 and electrically connects the conductor 270 to the source-side path 151. Under typical conditions, the vacuum interrupter 230 is closed and electricity flows between the source 102 and the load 103. The vacuum interrupter 230 is in series with the load 103. To remove the electrical connector 210 from the bushing 155, an operator places a hotstick or other pulling element in the opening 219 and pulls the electrical connector 210 away from the bushing 155. The electrical connector 210 separates from the bushing 155, thereby electrically disconnecting the conductor 270 from the source-side path 151. The separation between the bushing 155 and the electrical connector 210 also provide a visible indicator that the source 102 is no longer supplying power to the load 103.

Prior to removing the electrical connector 210 from the bushing 155, the vacuum interrupter 230 may be opened by controlling the actuator 232 to move the movable rod 216*b* in the X direction to separate the contacts 231*a* and 231*b*. The actuator 232 may be controlled through the control system 280, for example, by an operator or by an automated process. After the opening the vacuum interrupter 230, electricity no longer flows from the source-side path 151 into the conductor 270. Thus, opening the vacuum interrupter 230 prior to removing the electrical connector 210 from the bushing 155 reduces arcing that otherwise could occur at the time of separation.

Regardless of whether or not the vacuum interrupter 230 is opened prior to removing the electrical connector 210 from the bushing 155, after the electrical connector 210 is removed from the bushing 155, the source-side path 151 and the conductor 270 are not electrically connected. Thus, the removed electrical connector 210 provides a visible indicator that the source 102 is disconnected from the load 103.

FIG. 4 is a block diagram of a side cross-section of an electrical connector 410. The electrical connector 410 is another example of an implementation of an electrical connector that may be used in the electrical power system 100 (FIG. 1A). The electrical connector 410 is the same as the electrical connector 110, except the electrical connector 410 includes a mechanical control system 480. The mechanical control system 480 includes a mechanical actuation device 488 that is mechanically coupled to the actuation device 233 of the actuator 232. The mechanical actuation device 488 may be, for example, a lever or a button that is mechanically connected to the actuation devices 233. For example, the mechanical actuation device 488 may be connected to gears, rods, shafts, or other connecting devices that transfer the motion of the mechanical actuation device 488 to the actuation devices 233 such that the actuation device 233 reacts and moves the movable contact 231*b* and movable rod 216*b* along the X axis.

Figure 5:
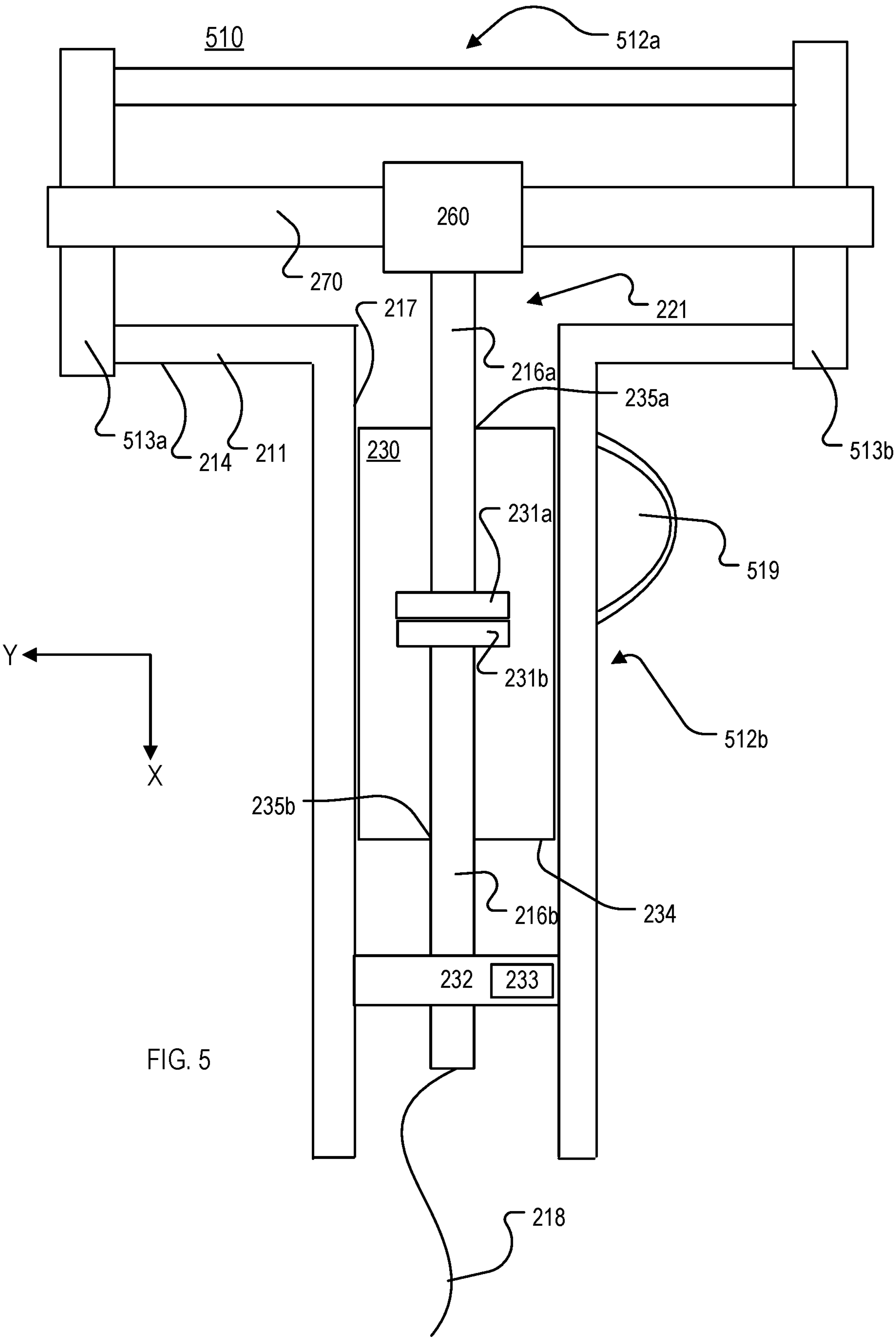
FIG. 5 is a side cross-sectional view of an electrical connector.

FIG. 5 is a block diagram of a side cross-section of an electrical connector 510. The electrical connector 510 is another example of an implementation of an electrical connector that may be used in the electrical power system 100 (FIG. 1A). The electrical connector 510 is similar to the electrical connectors 210 and 410, except the electrical connector 510 is a T-shaped connector and includes the interfaces 513*a* and 513*b*, each of which is similar to the interface 213. The electrical connector 510 includes the insulation 211, which forms a first portion 512*a* and a second portion 512*b*. The first portion 512*a* extends along the Y direction, and the second portion 512*b* extends along the X direction. The electrical connector 510 includes an opening 519 that extends from the second portion 512*b*. The opening 519 is sized to receive a hook, hotstick, or other manual tool for moving the electrical connector 510.

The above implementations are provided as examples, and other implementations are possible. For example, the vacuum interrupter 230 may be in the first portion 212*a* of the housing 212. Moreover, the electrical connector 110 may be implemented without the shield 114, and any of the electrical connectors 110, 210, 410, and 510 may be implemented without the shield 214. In implementations in which the electrical connector 110 lacks the shield 114, the insulating housing 111 is the exterior of the electrical connector 110. In implementations in which the electrical connector 210 or the electrical connector 310 lacks the shield 214, the insulation 211 forms the housing 212 and the insulation 111 is the exterior surface of the electrical connector 210 or 310. In implementations in which the electrical connector 510 lacks the shield 215, the first portion 512*a* and the second portion 512*b* are the exterior surface of the electrical connector 510. Implementations of the electrical connectors 110, 210, 410, and 510 with the shield or shell may be referred to as grounded electrical connectors. Implementations of the electrical connectors 110, 210, 410, and 510 that lack the shield or conductive shell may be referred to as ungrounded or unshielded electrical connectors.

FIG. 6 is a cross-sectional view of an electrical connector 610. The electrical connector 610 is another example of an electrical connector that may be used in the electrical power system 100 (FIG. 1A). The electrical connector 610 is similar to the electrical connectors 210, 410, and 510, except the electrical connector 610 lacks a conductive shield or shell. The electrical connector 610 may be considered an ungrounded or unshielded electrical connector.

The electrical connector 610 includes a T-shaped insulating housing 612. The insulating housing 612 forms an exterior surface 617 of the electrical connector 610. The housing 612 encloses the conductor 270, the contact assembly 260, and a switching apparatus (which in the example shown is the vacuum interrupter 230).

The housing 612 includes a first portion 612*a* that extends along the Y direction, and a second portion 612*b* that extends along the X direction. The housing 612 is made of an electrically insulating material 611. The material 611 may be, for example, silicone, rubber (such as EPDM), hardened epoxy, a hardened foam, and/or a polymer material. The material 611 may be rigid or flexible. The housing 612 may include more than one type of electrically insulating material 611, and the housing 612 may be formed in any suitable manner. For example, the housing 612 may be formed by molding, casting, deposition, and/or extrusion. In some implementations, the housing 612 includes multiple layers of electrically conductive material. For example, the housing 612 may include a first insulating material for an inner layer, and the first insulating material may be coated or covered with a second insulating material that forms the exterior surface 617 of the housing 612.

The housing 612 includes interfaces 613*a* and 613*b*, each of which is an opening at an opposite end of the first portion 612*a*. Each interface 613*a* and 613*b* is configured to mount to a bushing or connector of a separate device (such as the bushing 155 of FIG. 1A). When the interface 613*a* or 613*b* is mounted to an external bushing, the conductor 270 may be electrically connected to a conductor that is within the bushing.

As discussed above, the electrically insulating material 611 may be flexible or rigid. Thus, the interfaces 613*a* and 613*b* may be rigid or flexible. In implementations in which one or both of the interfaces 613*a* and 613*b* are flexible or pliable, the extent of the interface in the X-Z plane may be slightly smaller than the extent of the external bushing (such as the bushing 155) in the X-Z plane to encourage a secure mechanical attachment between the bushing and the flexible interface.

The electrical connector 610 also includes an opening 619 that extends from an exterior of the housing 612. The opening 619 may be, for example, a loop or half-circle. The opening 619 is sized to receive a hook, hotstick, or other manual tool for moving the electrical connector 610. Like the electrical connectors 110, 210, 410, and 510, the electrical connector 610 is configured to be easily moved and positioned by an operator.

Other implementations of the electrical connector are possible. For example, the electrical connector 610 may be an elbow connector that has a shape similar to the shape of the electrical connectors 210 and 310.

What is claimed is:

1. An electrical connector comprising:

an electrically insulating housing comprising a mechanical interface, the mechanical interface configured to mechanically connect to or disconnect from a bushing of a power device;

an electrically conductive shell at an outer surface of the electrically insulating housing;

an electrical system comprising:

an electrical conductor; and a switching apparatus electrically connected to the electrical conductor, the switching apparatus comprising at least a first state in which current flows in the electrical conductor and a second state in which current cannot flow in the electrical conductor, wherein the switching apparatus is in an interior of the electrically insulating housing; and a control system configured to control current flow in the electrical conductor by controlling the state of the switching apparatus.

2. An electrical connector comprising:

an electrically insulating housing comprising a mechanical interface, the mechanical interface configured to mechanically connect to or disconnect from a bushing of a power device;

an electrical system comprising:

an electrical conductor; and a switching apparatus electrically connected to the electrical conductor, the switching apparatus comprising at least a first state in which current flows in the electrical conductor and a second state in which current cannot flow in the electrical conductor, wherein the switching apparatus is in an interior of the electrically insulating housing;

a control system configured to control current flow in the electrical conductor by controlling the state of the switching apparatus; and an actuator coupled to the switching apparatus, wherein the control system is configured to control the actuator to cause the switching apparatus to open or close the electrical conductor; and wherein the control system is an electronic control system that is configured to communicate with the actuator to thereby control the switching apparatus.

3. The electrical connector of claim 1, wherein the electrical system further comprises a cable, and the switching apparatus is electrically connected to the electrical conductor and the cable.

4. The electrical connector of claim 1, wherein, when connected to the bushing of the power device, the mechanical interface surrounds the bushing of the power device.

5. The electrical connector of claim 1, wherein the electrically insulating housing further comprises a pulling structure, and the mechanical interface is configured to disconnect from the bushing of the power device in response to a force applied to the pulling structure.

6. The electrical connector of claim 5, wherein the pulling structure is configured to receive a hotstick, and the electrical connector is configured to be disconnected from the bushing of the power device with the hotstick.

7. The electrical connector of claim 1, wherein the switching apparatus comprises a vacuum interrupter.

8. The electrical connector of claim 1, further comprising an actuator coupled to the switching apparatus, and wherein the control system is configured to control the actuator to cause the switching apparatus to open or close the electrical conductor.

9. The electrical connector of claim 2, further comprising an electrically conductive shell at an outer surface of the electrically insulating housing.

10. The electrical connector of claim 2, wherein the control system is further configured to communicate with a remote station and is configured to control the actuator based on information from the remote station.

11. The electrical connector of claim 1, wherein the power device comprises a switchgear, a transformer, or a junction.

12. The electrical connector of claim 1, wherein the mechanical interface comprises a flexible material.

13. The electrical connector of claim 1, wherein the electrically insulating housing and the mechanical interface comprise a flexible material.

14. The electrical connector of claim 1, wherein the electrically insulating housing and the mechanical interface comprise a rigid material.

15. A system for an electrical power distribution network, the system comprising:

a power device comprising: an enclosure; and a bushing on an exterior of the enclosure, the bushing surrounding a power device conductor that extends into an interior of the enclosure; and an electrical connector comprising a bushing interface configured to connect to or disconnect from the bushing, the electrical connector comprising:

an electrically insulating housing that defines the bushing interface;

a switching apparatus inside the electrically insulating housing; and a conductor comprising:

a first end configured to electrically connect to the power device when the bushing interface is connected to the bushing; and a second end configured to electrically connect to a load, wherein the switching apparatus is configured to control current flow in the conductor, and wherein the electrical connector further comprises a conductive shell at an outer surface of the electrically insulating housing.

16. The system of claim 15, wherein the switching apparatus is in series with the load.

17. The system of claim 15, wherein the switching apparatus comprises a vacuum interrupter.

18. The system of claim 15, wherein the power device comprises a transformer or a junction.

19. The system of claim 15, further comprising a controller configured to control a state of the switching apparatus.

20. An electrical connector comprising:

an electrically insulating housing comprising a mechanical interface, the mechanical interface configured to mechanically connect the electrical connector to or disconnect the electrical connector from a bushing of a power device;

an electrically conductive shell at an outer surface of the electrically insulating housing;

an electrical system comprising:

an electrical conductor; and a switching apparatus in an interior of the insulating housing; and a control system configured to control current flow in the electrical conductor by controlling a state of the switching apparatus.

21. The electrical connector of claim 20, wherein the electrically conductive shell comprises a semiconductive material.

22. The electrical connector of claim 20, further comprising an actuator coupled to the switching apparatus, and wherein the control system is configured to control the actuator to cause the switching apparatus to open or close the electrical conductor.

* * * * *